United States Patent Office 3,032,349
Patented May 1, 1962

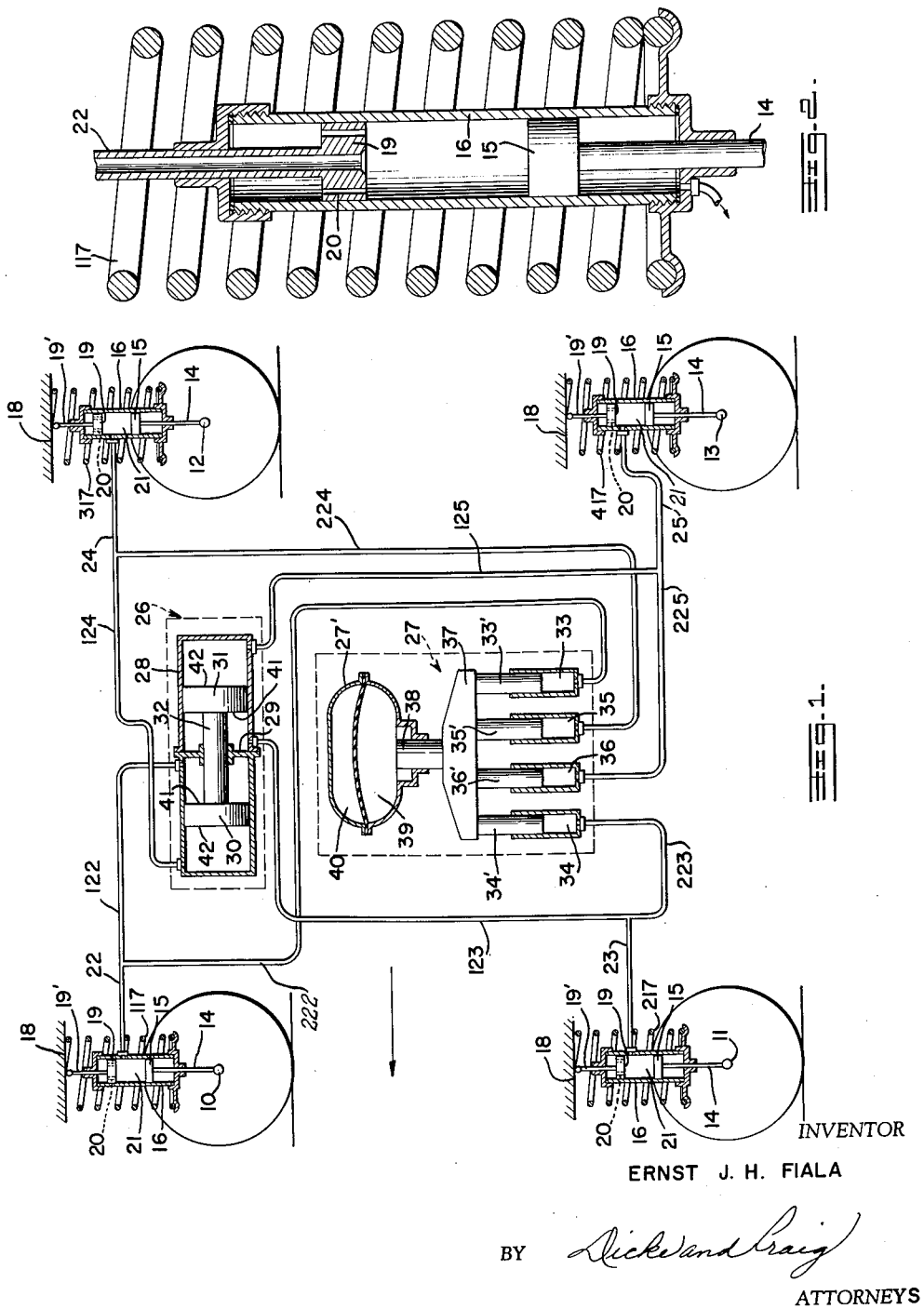
May 1, 1962     E. J. H. FIALA     3,032,349
EQUALIZATION SPRING SYSTEM FOR VEHICLES
Filed Nov. 21, 1958
INVENTOR
ERNST J. H. FIALA
BY
ATTORNEYS

3,032,349
EQUALIZATION SPRING SYSTEM FOR VEHICLES
Ernst J. H. Fiala, Sindelfingen, Kreis Boeblingen, Germany, assignor to Daimler-Benz Aktiengesellschaft, Stuttgart-Unterturkheim, Germany
Filed Nov. 21, 1958, Ser. No. 775,509
Claims priority, application Germany Nov. 26, 1957
21 Claims. (Cl. 280—104)

The present invention relates to an equalization spring system for vehicles, particularly for motor vehicles, and essentially consists in that the force absorbed by each individual wheel is transmitted or conducted over a branching or distribution arrangement, one branch of which leads to a common spring and the other branch of which leads to an equalization installation which establishes a predetermined ratio of the forces absorbed by the individual wheels with respect to each other.

By the use of an arrangement in accordance with the present invention, the spring characteristics such as, for example, spring stiffness, number of swinging movements, natural frequency of vibrations, etc. may be adapted to the individual cases of movements, for example, to spring movements parallel to the road bed, to nodding or nose-dive movements, to rolling movements, etc. and may furthermore be matched to the desired driving behavior, for example, to oversteering, understeering, etc. in a far-reaching manner according to the particular desire in each case.

For instance, by maintaining the common spring relatively soft, a relatively soft spring system parallel to the road bed or road surface may be achieved with a relatively stiff spring characteristic for the nodding or nose-dive movements as occur during braking, accelerations, etc., and for the rolling movements as occur, for example, with a curve inclination because in both of the last-mentioned cases, the common spring is not responsive, i.e., is not effective.

Furthermore, the equalization spring system in accordance with the present invention makes it possible to influence the oversteering or understeering behavior of the vehicle in the desired sense by fixing the ratio of the loading difference of the two front wheels to the loading difference of the two rear wheels when passing through a curve.

In accordance with the preesnt invention, it is proposed with a force transmission by means of a hydraulic or pneumatic medium that the equalization installation be provided with two pistons which each are loaded or acted upon on both sides thereof having differently effective piston surfaces by the pressure force emanating from a respective front and rear wheel, whereby the two pistons may be connected by a piston rod which extends through the separating or partition wall coordinated to or associated with the two pistons.

The common spring, for example, a hydropneumatic spring may be provided with a common rigid tension member which is individually acted upon or loaded from the force transmission branches coordinated to or operatively connected with the individual wheels.

The present invention, in addition to the common spring, also proposes the provision of individual springs for the individual wheels. This may be so arranged in accordance with the present invention that ahead of the branching or distribution arrangement mentioned hereinabove, a further force distribution or branching arrangement is provided by means of which the force absorbed or taken up by the respective wheel is subdivided into a parallel branch with respect to the first-mentioned branching installation and into another branch leading to a spring supported at the vehicle.

In installations provided with a force transmission by means of a hydraulic or pneumatic medium, this further branching or distribution arrangement may consist of a cylinder springily supported at the vehicle, the piston of which is operatively connected with the wheel support member or wheel carrier member and from the pressure space of which a line or conduit leads to the first-mentioned branching or distribution arrangement. The last-descibed branching arrangement may simultaneously be constructed as shock absorber, especially in such a manner that a piston having narrow throttling passages for the hydraulic or pneumatic medium is arranged in the cylinder above the piston operatively connected with the wheel carrier member. The transmission medium may be conducted thereby from the pressure space of the cylinder through the hollow piston rod of the piston rigidly connected with the vehicle toward the first-mentioned branching arrangement.

Accordingly, it is an object of the present invention to provide a spring equalization system for motor vehicles which is relatively simple in construction and versatile in the operational characteristics obtainable thereby.

Another object of the present invention is the provision of a spring equalization system which enables, by simple means, to influence the oversteering or understeering behavior of the vehicle, as the case may be.

Still a further object of the present invention is the provision of an equalization spring system which offers very favorable spring characteristics for the different spring movements which may occur in a motor vehicle.

Another object of the present invention is the provision of an equalization spring system in which the structural unit forming part of the spring equalization system and connected with the wheel carrier member at the same time effectively forms a shock absorber.

These and other objects, features and advantages of the present invention will become more obvious from the following description when taken in connection with the accompanying drawing, which shows, for purposes of illustration only, two embodiments in accordance with the present invention, and wherein:

FIGURE 1 is a schematic diagrammatic view of the overall installation of an equalization spring system in accordance with the present invention, and FIGURE 2 is a cross sectional view, on an enlarged scale, through a shock absorber in accordance with the present invention supported at the vehicle and forming part of the spring equalization system in accordance with the present invention.

Referring now to the drawing, wherein like reference numerals are used to designate corresponding parts in the two figures thereof, and more particularly to FIGURE 1, reference numerals 10 and 11 designate the axle members, schematically illustrated therein, of the right and left front wheel of the vehicle, respectively. Reference numerals 12 and 13 designate the axle members, schematically illustrated therein, of the right and left rear wheel of the vehicle, respectively. Each axle member 10, 11, 12 and 13 is operatively connected with a piston 15 over a piston rod 14 which piston 15 is adapted to reciprocate in a respective cylinder 16. The cylinder 16, in turn, is spring supported against a relatively stationary part 18 of the vehicle, such as, the vehicle body, the frame, the vehicle superstructure, etc. by means of a respective coil spring 117, 217, 317 and 417. A piston 19 is rigidly connected with the relatively stationary vehicle part 18 over a piston rod 19' and each piston 19 is provided with relatively narrow bores 20 (FIGURES 1 and 2) extending clear across the same. Lines 22, 23, 24 and 25 lead away from a respective cylinder space 21 formed between two respective pistons 15 and 19 which lines 22, 23, 24 and 25 in turn each are subdivided or branched off into two lines 122 and 222, 123 and 223, 124 and 224, and 125 and 225, respectively. The lines 122, 123, 124 and 125 lead to an equalization installation generally designated by reference numeral 26, whereas lines 222, 223, 224 and 225 lead to a common spring generally designated by reference numeral 27.

The equalization installation 26 consists of a double-cylinder 28 provided with a separating or partition wall 29. A piston 30 and 31 each reciprocates in the individual cylinder spaces formed on opposite sides of the separating wall 29, whereby both pistons 30 and 31 are rigidly connected with each other by a piston rod 32. The effective cross-sectional surface of the pistons 30 and 31 on the free side thereof is designated by reference numeral 42 whereas the side of each piston 30 and 31 facing the piston rod 32 is designated by reference numeral 41 respectively. The termination or discharge orifices of the lines 122, 123, 124 and 125 into the individual spaces in cylinder 28 formed by the cylinder wall 29 and the pistons 30 and 31 is clearly visible from FIGURE 1. Line 122 terminates in the part of cylinder 28 intermediate separating wall 29 and piston 30; line 123 terminates in the part of cylinder 28 intermediate the separating wall 29 and piston 31, while line 124 terminates in the part of cylinder 28 forming the pressure space for the surface 42 of piston 30, and line 125 terminates in the part of cylinder 28 forming the pressure space for the surface 42 of piston 31.

The lines 222, 223, 224 and 225 terminate each in a respective cylinder 33, 34, 35 and 36, one piston 33', 34', 35' and 36' each being displaceably arranged in each of these cylinders 33 through 36. The different pistons 33', 34', 35', and 36' are rigidly connected with one another by a cross member 37. A piston member 38 operatively or rigidly connected with the cross member 37 extends into the oil space 39 of a hydropneumatic spring 27' having also a pneumatic pressure space 40.

FIGURE 2 shows a constructive embodiment of slightly modified construction in accordance with the present invention of the spring and shock absorber arrangement located in proximity to the wheel. The reference numerals used in FIGURE 2 are the same as those used in connection with FIGURE 1. However, the shock absorber-spring combination of FIGURE 2 is different from that of FIGURE 1 in that the line 22 extends through the piston rod of the piston 19.

OPERATION

The operation of the installation in accordance with the present invention will be explained with reference to some spring conditions and spring movements which may occur in such a spring system:

1. *Uni-Directional Spring Movements of All Four Wheels*

When all four wheels move in the same direction causing a spring movement parallel to the road bed or road surface, then an increase in pressure takes place in all lines 22, 122, 222, 23, 123, 223, 24, 124, 224 and 25, 125, and 225. The increase in pressure in the lines takes place as a result of the fact that each piston 15 moves upwardly and therewith displaces upwardly a respective cylinder 16 against the force of a respective spring 117, 217, 317 or 417, though damped by reason of the narrow bores 20, and also increases the pressure correspondingly in a respective line 22, 23, 24 or 25. The increase in pressure in lines 122 to 125 has no further consequences; the piston unit or piston aggregate 30, 31 remains at rest. However, in contradistinction thereto, the increase in pressure in the lines 222 through 225 causes a further immersion or extension of the piston 38 into the oil space 39 of the hydropneumatic spring 27'. Consequently, the mechanical springs 117, 217, 317, 417 as well as the hydropneumatic spring 27 are operative or effective under these operating conditions. By appropriately selecting the spring 27 relatively soft, a very soft parallel spring system may be obtained.

2. *Curve Tilting or Inclination*

If the vehicle passes through a curve, for example, through a left curve, then the pressure in the lines 22, 122, 222 and 24, 124, 224 increases by the same amount as it decreases in the lines 23, 123, 223 and 25, 125, 225. As a result thereof, the cross member 37 together with the piston 38 is not displaced and the hydropneumatic spring 27 is not responsive, i.e., is not operative to respond to changes. Equilibrium can be obtained in the equalization system 26 only if the pressure difference between the line 22 and the line 23 is larger in the ratio of the surfaces 42 to 41 than the pressure difference in the lines 24 and 25. The surfaces 41 and 42 form a regulating means for establishing a predetermined ratio of the forces absorbed by the individual wheels with respect to each other since by appropriate selection of the surfaces 41 and 42, the oversteering or understeering response or characteristics of the vehicle may readily be influenced since the latter are dependent on the ratio of the aforementioned pressure differences. Consequently the curve inclination or tilting of the vehicle is determined only by the stiffness of the springs 117, 217, 317 and 417, however, not by the spring 27.

3. *Uni-Directional Spring Movements of the Wheels of One Axle in One Direction and of Wheels of the Other Axle in the Other Direction (Nose-Diving or Nodding Movement)*

When the two front wheels are subjected to a spring movement in one direction and the rear wheels are subjected to spring movements in the opposite direction, for example, during nose-diving, a pressure increase takes place in the lines 22 and 23. The corresponding increase in the lines 122 and 123 does not produce any movement of the equalization piston unit 30, 31.

Furthermore, the pressure decrease which occurs during the braking, nose-diving movement mentioned hereinabove, which takes place in the lines 24 and 25 as well as lines 124 and 125, has no effect on the equalization installation 26.

The spring 27 also does not become effective or responsive since the pressure acting on pistons 33', 34' arranged in cylinders 33 and 34 increases, whereas the pressure on the pistons 35' and 36' arranged in cylinders 35 and 36 correspondingly decreases. Consequently, the magnitude of the brake nodding movement or nose-dive movement is determined only by the springs 117, 217, 317 and 417 and the spring stiffness thereof.

4. *Uni-Directional Movement of Diagonally Arranged Wheels*

If, for example, the left front wheel and the right rear wheel are lifted or raised, then at first the pressure in lines 23 and 24 increases. As a result of this increase of the pressure in lines 23 and 24, the piston aggregate 30, 31 is moved or displaced toward the right, as viewed in FIGURE 1, for such length of time until the same pressure is again established in all four lines 22, 23, 24 and 25. Consequently, no torsional stresses are introduced into the frame or vehicle body of the vehicle under those conditions.

While I have shown and described two embodiments in accordance with the present invention, it is understood that the same is not limited thereto but is susceptible of many changes and modifications within the scope and spirit of the present invention, and I therefore do not wish to be limited to the specific embodiments described herein only for purposes of illustration, but intend to cover all such changes and modifications as encompassed by the scope of the appended claims.

I claim:

1. An equalization spring system for vehicles, particularly motor vehicles having a plurality of oppositely-disposed front and rear wheels with wheel support means, comprising equalization means, a common spring means, and connecting means including a plurality of branch line means for transmitting the force absorbed by each said wheel to said equalization means through one of said branch line means and to said common spring means through another branch line means, said equalization means including regulating means establishing a predetermined ratio of the forces absorbed by the individual wheels with respect to each other.

2. An equalization spring system according to claim 1, in which a hydraulic medium is used for the transmission of the forces absorbed by the individual wheels.

3. An equalization spring system according to claim 1, in which a pneumatic medium is used for the transmission of forces between the individual wheels.

4. An equalization spring system according to claim 1, wherein said common spring means is a hydropneumatic spring and includes a common rigid tensioning member, and means for individually actuating said common tensioning member from each individual wheel over a respective one of said branch line means operatively connected with the corresponding wheel.

5. An equalization spring system provided with fluid means for the force transmission in vehicles having a plurality of oppositely-disposed front and rear wheels with wheel support means, comprising equalizing means including differential piston means, common spring means, and connecting means including a plurality of branch line means for transmitting the force absorbed by each wheel to said equalizing means through one of said branch line means and to said common spring means through another one of said branch line means, said equalizing means including regulating means establishing a predetermined ratio of the forces absorbed by the individual wheels with respect to each other.

6. An equalization spring system according to claim 5, wherein said common spring means includes a common actuating member, and wherein said connecting means includes means for actuating said common actuating member in an individual manner from each of said wheels.

7. An equalization spring system provided with fluid means for the transmission of forces in vehicles, particularly motor vehicles having a relatively stationary part and a plurality of wheels with wheel support means, comprising equalizing means, individual spring means for each wheel for spring-supporting the same against said relatively stationary part, a common spring means, and connecting means including first branch line means having a plurality of parallel lines for transmitting the force absorbed by each wheel to said equalizing means through one line and to said common spring means through another line in parallel with said one line and second branch line means arranged in said connecting means ahead of said first branch line means and having a plurality of parallel lines for transmitting a portion of the force absorbed by each wheel to a respective one of said individual spring means and another portion of the force absorbed by each wheel to a respective one of said first branch line means, regulating means establishing a predetermined ratio of the forces absorbed by the individual wheels with respect to each other.

8. An equalization spring system according to claim 7, wherein said equalization spring system includes fluid means for the transmission of forces, and wherein said second branch line means includes a cylinder springily supported by a respective individual spring means against said relatively stationary part, a piston operatively connected with a respective wheel carrier means, and a line leading from the pressure space of said cylinder to said first branch line means.

9. An equalization spring system according to claim 8, wherein said second branch line means simultaneously forms a shock absorber and includes another piston disposed in said cylinder above said first-mentioned piston operatively connected with said relatively stationary part, said second-mentioned piston being provided with narrow apertures for the passage therethrough of said fluid means.

10. An equalization spring system according to claim 9, wherein the fluid means is conducted from the pressure space over the cylinder of said second branch line means to said first branch line means through the hollow piston rod of said second piston.

11. An equalization spring system according to claim 7, wherein said second branch line means is constructed as a shock absorber.

12. An equalization spring system according to claim 11, wherein each shock absorber includes a cylinder, a first piston member operatively connected with a respective wheel support means, a second piston member rigidly connected with said relatively stationary part and a conduit for conducting the fluid means from the pressure space of a cylinder to a respective first branch line means.

13. An equalization spring system provided with fluid means for the transmission of spring forces in vehicles, having a relatively stationary part and a plurality of oppositely disposed front and rear wheels with wheel support means, comprising equalization means, individual spring means operatively connected with each wheel for spring supporting the same against said relatively stationary part, common spring means, and connecting means operatively connecting each wheel support means with said common spring means and said equalization means including means operatively connected with each wheel support means to apply a portion of the forces absorbed by each wheel to a respective one of said individual spring means and for transmitting another portion of the forces absorbed by each individual means through a conduit and a parallel line system connected with a respective one of said conduits including a first line leading to said equalization means and a second line leading to said common spring means, said equalization means including differential piston means to establish a predetermined ratio of the forces absorbed by the individual wheels with respect to each other.

14. An equalization spring system according to claim 13, wherein said common spring means includes a hydropneumatic spring, a cylinder supplied with fluid means from a respective one of said lines, a piston in said cylinder, and a common actuating member for said hydropneumatic spring operatively connected with all of the pistons reciprocating in respective cylinders supplied by said lines.

15. An equalization spring system according to claim 14, wherein each of said means operatively connected with a respective wheel support means is constructed as a shock absorber and includes a cylinder, a first piston in said cylinder operatively connected with a respective wheel support means, a second piston provided with throttling apertures operatively connected with said relatively stationary part and means placing a respective conduit into communication with the pressure space formed between said two last-named pistons.

16. An equalization spring system according to claim 15, wherein a fluid medium is used for the transmission of forces absorbed by the individual wheels, and wherein said differential piston means includes two pistons, each of which has two pressure surfaces of different effective area, which surfaces are acted upon by said fluid medium under pressure coming from a respective front and rear wheel of the vehicle, and a piston rod interconnecting said two pistons.

17. An equalization spring system provided with fluid means for the transmission of spring forces in vehicles, particularly motor vehicles having a plurality of oppositely-disposed front and rear wheels with wheel support means, comprising equalization means including two pistons each having two piston surfaces of different effective area, a common spring means, and connecting means including a plurality of branch line means for transmitting by said fluid means the force absorbed by each said wheel to said piston surfaces through one of said branch line means and to said common spring means through another branch line means, each said piston surface being acted upon by said fluid means under pressure and coming from a respective front and rear wheel, said equalization means including regulating means establishing a predetermined ratio of the forces absorbed by the individual wheels with respect to each other.

18. An equalization spring system according to claim 17, wherein said common spring means is a hydropneumatic spring and includes a common rigid tensioning member, and means for individually actuating said common tensioning member from each individual wheel over a respective one of said branch line means operatively connected with the corresponding wheel.

19. An equalization spring system according to claim 17 wherein said equalizing means includes cylinder means for said two pistons provided with a separating wall to form a cylinder space for each of said pistons, and a piston rod extending through said separating wall and interconnecting said two pistons.

20. An equalization spring system according to claim 19, wherein said two cylinders have the same diameter and wherein said piston rod extends only within the region between said two pistons.

21. An equalization spring system according to claim 20, wherein said common spring means is a hydropneumatic spring and includes a common rigid tensioning member, and means for actuating said common tensioning member over some of said branch line means from the individual wheels.

References Cited in the file of this patent

UNITED STATES PATENTS 2,843,396     Lucien _____ July 15, 1958

FOREIGN PATENTS 68,500     France _____ Nov. 12, 1957
            (2nd Addition to No. 1,100,585)
363,811    Great Britain _____ Dec. 31, 1931